J. D. CAPSHAW.
SWINGLETREE.
APPLICATION FILED OCT. 5, 1916.
1,240,938.  Patented Sept. 25, 1917.
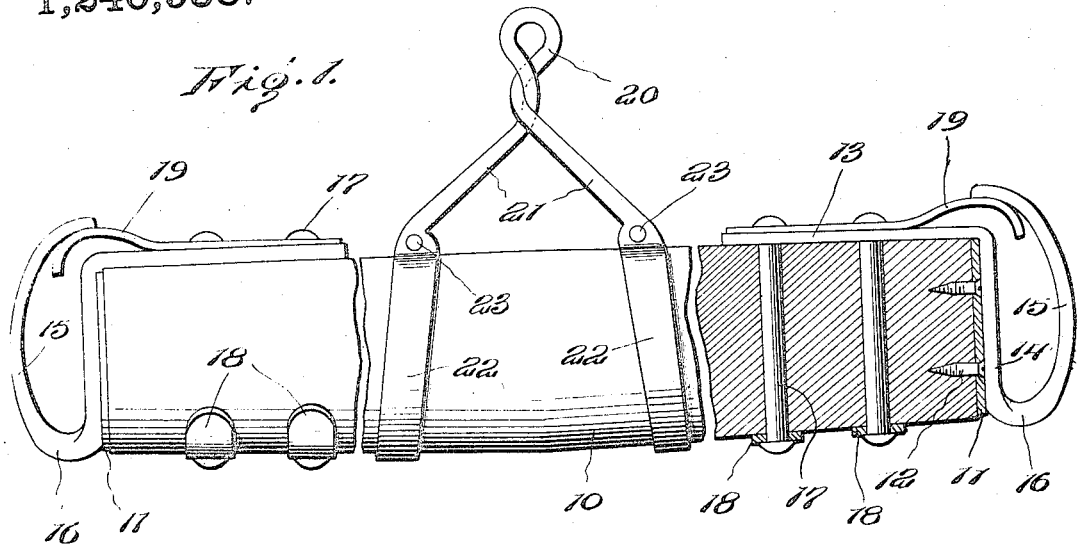
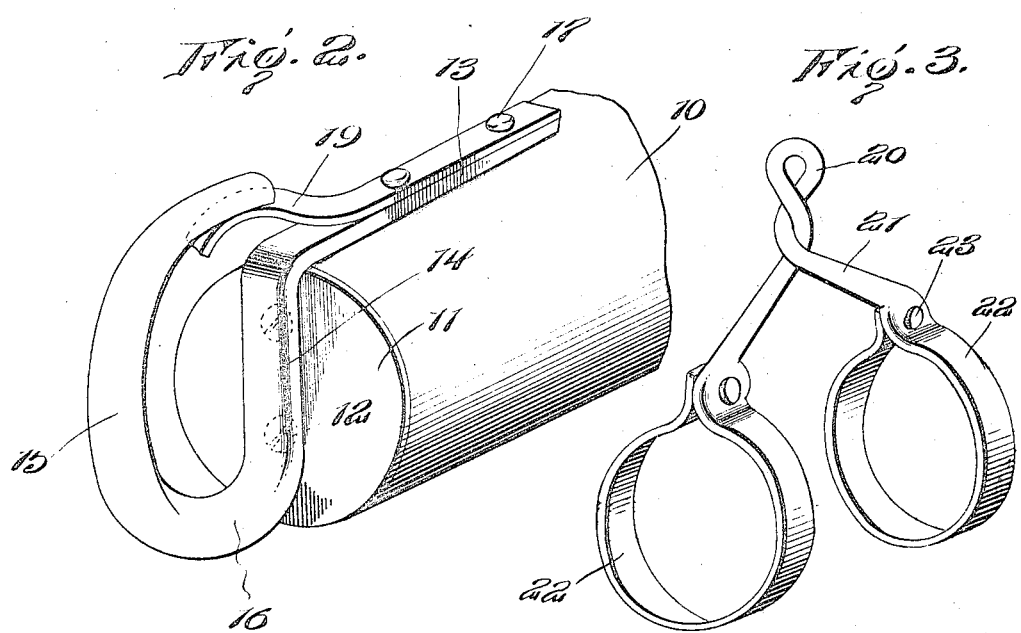
Inventor
J. D. Capshaw.

UNITED STATES PATENT OFFICE.

JAMES D. CAPSHAW, OF MONTEREY, TENNESSEE.

SWINGLETREE.

1,240,938.      Specification of Letters Patent.      Patented Sept. 25, 1917.

Application filed October 5, 1916. Serial No. 123,936.

*To all whom it may concern:*

Be it known that I, JAMES D. CAPSHAW, a citizen of the United States, residing at Monterey, in the county of Overton and State of Tennessee, have invented certain new and useful Improvements in Swingletrees, of which the following is a specification.

This invention relates to an improved swingletree and has as its primary object to provide a device of this character which will be of sturdy construction and which may, at the same time, be easily and inexpensively produced.

The invention has as a further object to provide an improved construction of trace hook for the swingletree as well as an improved mounting for the said hook.

And the invention has as a still further object to provide an improved center clip for the swingletree formed to distribute the strain upon the clip longitudinally of the tree.

Other and incidental objects will appear as the description proceeds and in the drawings wherein I have illustrated the preferred embodiment of the invention and wherein similar reference characters designate corresponding parts throughout the several views, Figure 1 is a plan view of my improved swingletree, the body of which has been broken away with one end thereof shown in section to more clearly illustrate the mounting of the trace hooks upon the tree, Fig. 2 is a detail perspective view on a slightly enlarged scale particularly showing the type of trace hook employed, and Fig. 3 is a perspective view showing the center clip for the tree detached.

In carrying out the invention, the tree is formed with a suitable body 10 of wood or other approved material. This body is preferably tapered toward its extremities and the rear edge thereof is straight while the forward edge of the said body is inclined toward opposite extremities thereof, since the body is preferably thickened intermediate its ends as more particularly shown in Fig. 1, to withstand the strain upon the tree.

Connected to the extremities of the body are wear plates 11. These plates are preferably in the nature of suitable metallic disks and are arranged to seat flat against the ends of the body to be secured thereto by wood screws or other suitable fastening devices 12.

Mounted upon the extremities of the tree are trace hooks. These hooks are preferably formed of suitable metal and each includes a shank 13 seating against the rear edge of the body 10 of the tree with the said shank bent laterally and forwardly at its outer extremity to provide a leg 14 overlying the screws 12 at the adjacent end of the tree body to prevent the displacement of the said screws. At its forward extremity, the leg 14 is extended to provide the bill 15 of the hook which is bent to extend rearwardly from the said leg with the said hook curving longitudinally toward the rear edge of the swingle tree and, at its free end, overlying the shank 13 in spaced relation thereto. At the juncture of the leg 14 with the hook 15, the bight of the hook is preferably thickened as shown at 16 for receiving the wear of the trace, and from the said thickened portion, the said hook is preferably tapered toward its free end so that a trace may be easily inserted thereover.

Connecting the trace hooks with the body of the swingletree, are spaced bolts or other suitable fastening devices 17 which, at their rear extremities, are extended through the shanks 13 of the said hooks with the forward ends of the said bolts engaged with suitable clips 18 bent around the front face of the body of the tree. It will now be observed that the hooks are thus mounted with the legs 14 thereof abutting the wear plates 11 upon the ends of the tree and these plates are adapted to prevent the said legs or the shanks 13 of the hooks from cutting into the body of the tree under stress upon the said hooks. Moreover, the plates 11 will tend to prevent splitting of the tree body at its ends and will tend to overcome any tendency of the traces to mutilate the tree ends.

Seated upon the shanks 13 of the trace hooks and engaged beneath the fastening devices 17 are springs 19, the free ends of which curved forwardly beneath the free ends of the hooks 15 to normally engage therewith. These springs will, therefore, act to prevent the accidental displacement of the traces from the hooks 15 while, at the same time, the said springs may be easily depressed to permit the removal of the said traces.

Connected to the central portion of the body 10 is a center clip for the tree. This clip is, as particularly shown in Fig. 3, preferably formed from a single length of suitable metallic rod bent intermediate its ends to provide overlapping portions twisted together to form an attaching loop 20. From the twist, the said portions are extended outwardly away from each other in divergent relation to form arms 21 and are thence flattened with the flattened portions bent to define spaced loops 22 at the outer ends of the said arms. The loops 22 are arranged to embrace the body 10 of the swingle tree upon opposite sides of the longitudinal center thereof with the free ends of the said loops secured by rivets or other suitable fastening devices 23 for tightly connecting the clip with the tree. As particularly shown in Fig. 1, the arms 21 of the clip are arranged to support the attaching loop 20 thereof in the rear of a point substantially midway between the ends of the tree body and stress upon the said loop will be communicated through the said arms to the loops 22 which will thus distribute the strain upon the clip longitudinally of the tree body upon opposite sides of the center thereof. The likelihood of the breaking of the body of the tree is thus materially reduced and it is to be observed that the loops 22 of the clip are connected to the tree body adjacent the thickest portion thereof.

It will, therefore, be seen that I provide an exceedingly simple and efficient structure for the purpose set forth and a tree which while being of a sturdy nature may, nevertheless, be easily and inexpensively produced.

Having thus described my invention, what is claimed as new is:

A device of the character described including a hook for attachment to a swingletree and provided with a shank connected to one face of the tree with the said shank having a leg extending laterally therefrom and projecting transversely of the adjacent end of the tree to support the bill of the hook, a wear plate fitted between said leg and the adjacent end of the tree, and a fastening device connecting the said plate with the tree with the said leg overlying said fastening device and holding said device against displacement.

In testimony whereof I affix my signature.

JAMES D. CAPSHAW. [L. S.]